(12) United States Patent
Ezaki et al.

(10) Patent No.: US 8,949,908 B2
(45) Date of Patent: Feb. 3, 2015

(54) CONTENT UPLOAD SYSTEM AND CONTENT DISTRIBUTION SERVER

(75) Inventors: Toshihiro Ezaki, Osaka (JP); Masaaki Higashida, Osaka (JP)

(73) Assignee: Panasonic Intellectual Property Management Corporation, Osaka (JP)

( * ) Notice: Subject to any disclaimer, the term of this patent is extended or adjusted under 35 U.S.C. 154(b) by 0 days.

(21) Appl. No.: 13/375,929

(22) PCT Filed: Jun. 4, 2010

(86) PCT No.: PCT/JP2010/003731
§ 371 (c)(1),
(2), (4) Date: Dec. 2, 2011

(87) PCT Pub. No.: WO2010/140376
PCT Pub. Date: Dec. 9, 2010

(65) Prior Publication Data
US 2012/0090011 A1    Apr. 12, 2012

(30) Foreign Application Priority Data
Jun. 5, 2009    (JP) ................................. 2009-135834

(51) Int. Cl.
*H04N 7/18*       (2006.01)
*H04N 7/173*     (2011.01)
*H04H 20/62*     (2008.01)

(52) U.S. Cl.
CPC ........... *H04N 7/17336* (2013.01); *H04H 20/62* (2013.01)
USPC ................................. 725/76; 725/74; 725/82

(58) Field of Classification Search
USPC ................................. 725/76, 68, 91, 103, 109
See application file for complete search history.

(56) References Cited

U.S. PATENT DOCUMENTS

| | | | |
|---|---|---|---|
| 7,675,849 B2 * | 3/2010 | Watson et al. ................ 370/217 |
| 2005/0256616 A1 * | 11/2005 | Rhoads ............................. 701/1 |
| 2008/0070517 A1 * | 3/2008 | Brady et al. .................... 455/98 |
| 2009/0003592 A1 | 1/2009 | Hanai |
| 2009/0077594 A1 * | 3/2009 | Milosevski et al. ............. 725/76 |
| 2009/0228908 A1 * | 9/2009 | Margis et al. ..................... 725/6 |

FOREIGN PATENT DOCUMENTS

| | | | |
|---|---|---|---|
| JP | 2000-307968 A | 11/2000 |
| JP | 2003-199083 A | 7/2003 |

(Continued)

OTHER PUBLICATIONS

International Search Report for PCT/JP2010/003731, Jun. 29, 2010.

*Primary Examiner* — Nasser Goodarzi
*Assistant Examiner* — Fred Peng
(74) *Attorney, Agent, or Firm* — McDermott Will & Emery LLP

(57) ABSTRACT

A content upload system includes: a content distributing server that is installed in an airplane and distributes audio-video contents into the airplane; and a plurality of content accumulating servers that are installed in a plurality of airports, in which the airplane is parked, and transmit the audio-video contents to the content distributing server through a network. The content distributing server selectively writes audio-video contents that have not been stored in the content distributing server of audio-video contents transmitted from the content accumulating server while the airplane is parked on the airport.

8 Claims, 6 Drawing Sheets

(56) References Cited

FOREIGN PATENT DOCUMENTS

| JP | 2004-120150 A | 4/2004 |
| JP | 2007-081542 A | 3/2007 |
| JP | 2002-320183 A | 3/2008 |
| JP | 2008-117116 A | 5/2008 |
| JP | 2008-306600 A | 12/2008 |
| JP | 2009-021902 A | 1/2009 |
| WO | WO2008/033534 A2 | 3/2008 |

* cited by examiner

CONTENT UPLOAD SYSTEM AND CONTENT DISTRIBUTION SERVER

This application is a U.S. National Phase Application of PCT International Application No. PCT/JP2010/003731.

TECHNICAL FIELD

The present invention relates to a content upload system and a content distributing server that uploads an out-of-flight audio-video content on an in-flight passenger seat distribution server in an in-flight entertainment system.

BACKGROUND ART

In an international passenger airplane (to be simply referred to as an "airplane" hereinafter) or the like, an in-flight entertainment system is mounted to provide an entertainment service to passengers during a long-time flight. In general, a dedicated display terminal is arranged on a rear surface of a backrest of each seat, and headphones can be connected to each seat. In this manner, each passenger can enjoy video contents, audio contents, or games during a flight.

As these video and audio contents, in accordance with various preferences of passengers, programs of as many types as possible need to be prepared to make it possible to continuously provide services during a long-time flight. In this manner, in order to accumulate a large number of contents or distribute contents depending on selection requests from a plurality of passengers, a content distributing server is installed in an airplane.

A basic configuration of a conventional in-flight entertainment system is shown in FIG. 6. Display terminals 221 to 223 are installed in seats 211 and 213, and, at the same time, headphones 231 to 233 are connected to seats 211 and 213. Audio-video contents are accumulated in content distributing server 201 and transmitted to display terminals 221 to 223 and headphones 231 to 233 through network 240. Since the audio-video contents flowing on the network 240 are encoded to compress an amount of information, the audio-video contents are decoded by audio-video decoders (not shown) built in content processing terminals 251 and 253 immediately before the audio-video contents are reproduced by display terminals 221 to 223 or headphones 231 to 233.

On the other hand, the audio-video contents need to be updated into new contents every predetermined period. For example, with respect to movies, an air carrier provides an unreleased movie to passengers as early as possible to differentiate services for passengers. As methods of updating audio-video contents, for example, a method of carrying audio-video contents packaged in an optical disk, a hard disk, a tape, or the like in an airplane to physically exchange the audio-video contents and a method of electrically exchanging (overwriting) audio-video contents through a network are present. Since a recent content distributing server is generally configured by a large-capacity hard disk, in this case, the latter, i.e., electrical updating by a network is used as a general means.

In the updating by a network, in general, contents are uploaded from a content accumulating server on the ground while an airplane is parked. Content accumulating servers holding the same audio-video content are installed in airport facilities, and an airplane can receive a necessary audio-video content even though the airplane is parked in any airport.

A time (upload time) required for uploading is determined by a total volume of audio-video contents to be updated and a speed of a network. For example, when the total volume of the contents and a communication speed are 100 GBytes and 100 Mbps, respectively, an upload time is about 2 hours and 13 minutes. A parking time is determined by a time required for maintenance of an airframe or loading/unloading of cargoes and packages, and the upload time is not preferentially determined. Therefore, when the volume of contents to be uploaded increases, it may be difficult to complete uploading of necessary contents while the airplane is being parked. Furthermore, in terms of improvement of serviceability in an in-flight entertainment system, in the future, a total volume of the audio-video contents may continuously increase. Therefore, it is prospected that updating of audio-video contents is more difficult to be completed while an airplane is parked in one airport.

In this manner, as a countermeasure used when content writing for a mobile object (airplane in the present invention) is not completed during a time for connection to a predetermined base station (airport facility in the present invention), for example, a method is disclosed in Patent Literature 1. In Patent Literature 1, it is supposed that contents are wirelessly transmitted to a mobile object such as trains or automobiles. The contents are written by receiving a radio wave from a specific wireless base station. Since a time in which a mobile object stays in a service area of a wireless base station or a time in which the mobile object passes through the service area is limited, writing of all the contents cannot be completed by only communication from a wireless base station, and only some contents are written. When a plurality of mobile objects that try to receive the same contents, partial contents held by the mobile objects are different from each other. For this reason, when the contents can be transmitted and received between the mobile objects, communication is defined such that shortages in contents of the mobile objects are complementary to each other.

For example, at the present, a mobile object holding only 50% of necessary contents repeats operations of causing the percentage of the contents to reach 70% by content complementarity from a mobile object which the mobile object encounters first and to reach 80% by content complementarity from a mobile object which the mobile object encounters next so that the percentage may reach 100% by performing inter-mobile-object communication several times. When the inter-mobile-object sequential content complementarity is performed, it can be expected that the held contents in the mobile objects gradually increase to complete amounts.

As described above, communication is repeated such that shortages in content between mobile objects holding only partial contents are complementary to each other to make it possible to increase the contents to a complete amount. However, although the method is probably used in a train or an automobile exemplified in Patent Literature 1, it is very difficult to use the method in an airplane which the present invention targets.

More specifically, the chance of causing flying airplanes to come to each other to perform direct wireless communication is rarely present. Even though the airplanes come close to each other to some extent, a communicable time is very short. Most of airplanes are owned by air carriers, and service contents of the air carriers are different from each other, it is actually impossible to hold the same audio-video contents in airplanes of different air carriers. Therefore, content complementarity between mobile objects as described in Patent Literature 1 cannot be applied to airplanes.

CITATION LIST

Patent Literature

PTL 1: Unexamined Japanese Patent Publication No. 2007-81542

SUMMARY OF THE INVENTION

The present invention provides a content upload system including: a content distributing server that is installed in an airplane and distributes audio-video contents into the airplane; and a plurality of content accumulating servers that are installed in a plurality of airports, in which the airplane is parked, and transmit the audio-video contents to the content distributing server through a network, wherein the content distributing server selectively writes audio-video contents that have not been stored in the content distributing server of audio-video contents transmitted from the content accumulating server while the airplane is parked on the airport.

In this manner, large-volume audio-video contents can be dispersively written on the occasion of parking on a plurality of airports.

The present invention provides a content distributing server that receives audio-video contents from a content accumulating server installed in an airport through a network and distributes the audio-video contents into an airplane, the server including: a recording unit that records the audio-video contents; a content collating unit that collates the audio-video contents in the recording unit with the audio-video contents received from the content accumulating server; and a recording control unit that selectively writes, in the recording unit, audio-video contents determined by the content collating unit not to have been recorded on the recording unit.

DESCRIPTION OF EMBODIMENTS

A content upload system in an embodiment of the present invention will be described below with reference to the drawings.

First Exemplary Embodiment

Figure 1:
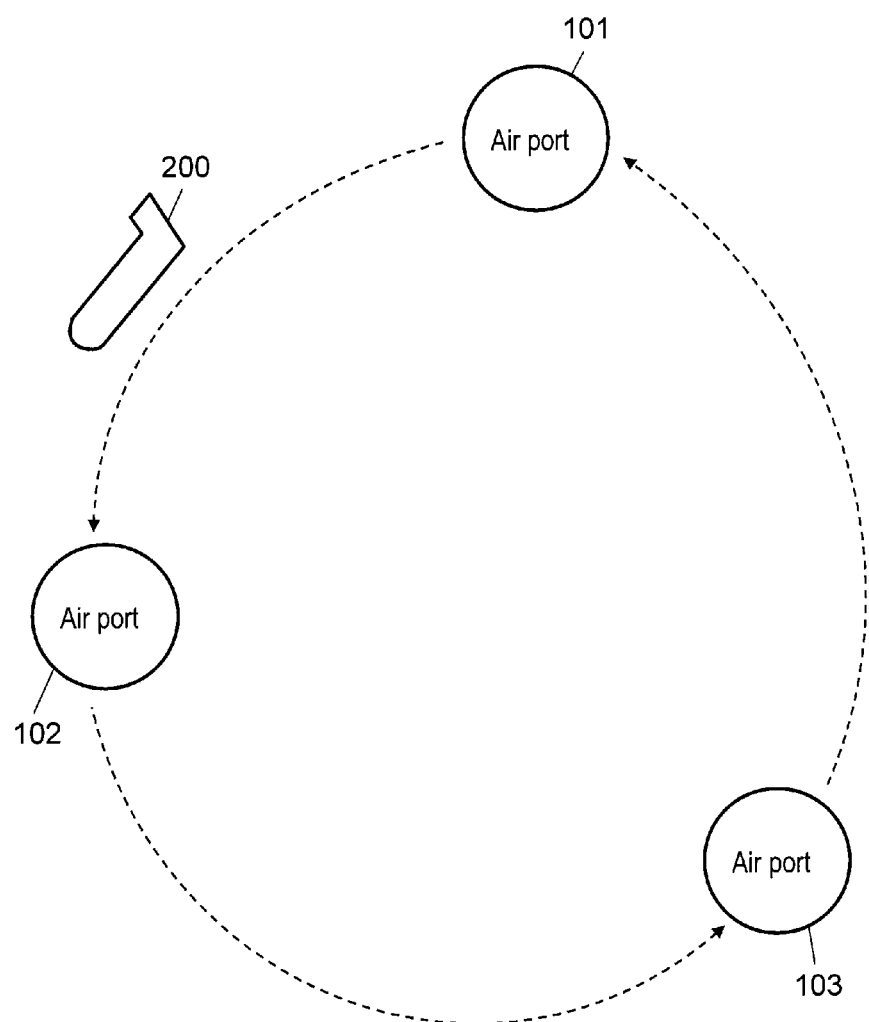
FIG. 1 is a diagram schematically showing a flight path of an airplane and airports on which an airplane is parked in a first exemplary embodiment of the present invention.
Figure 2:
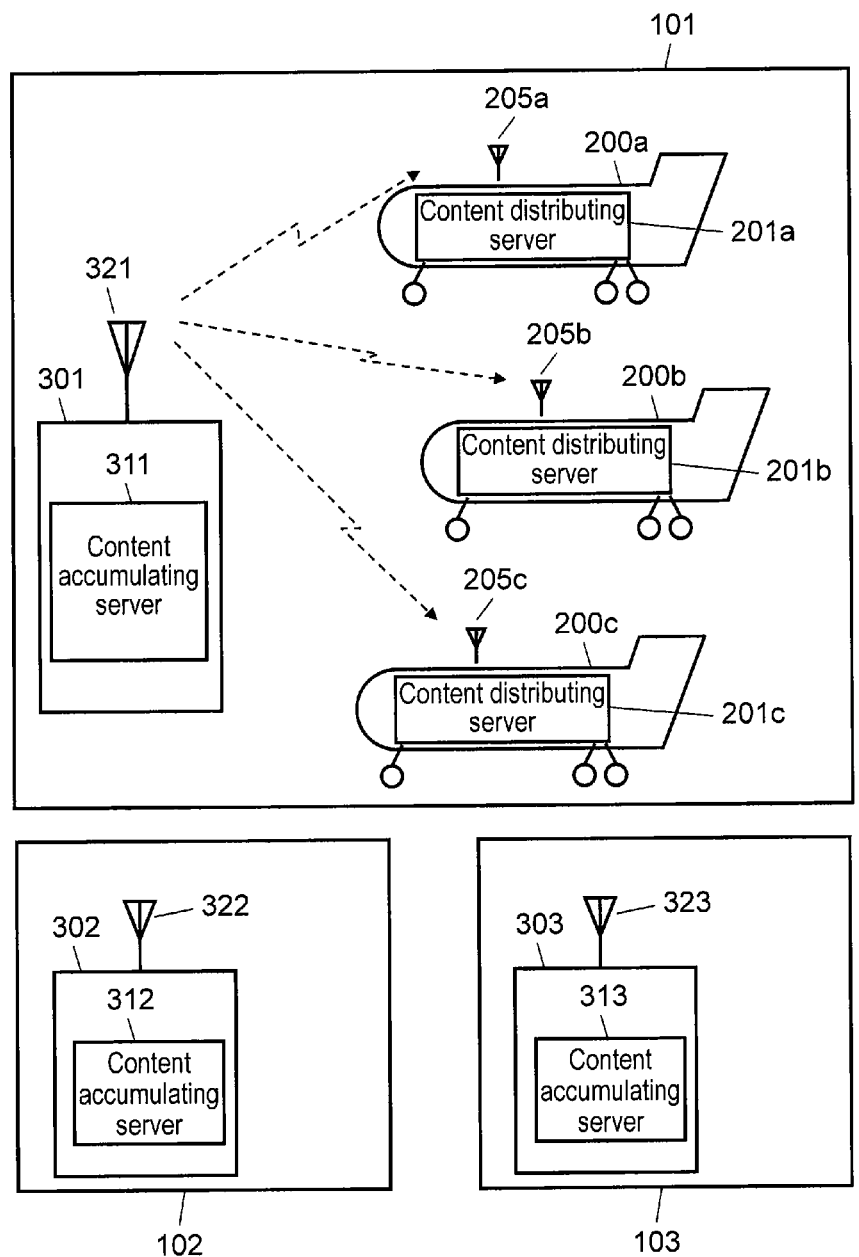
FIG. 2 is a block diagram showing a basic configuration of a content upload system in the first exemplary embodiment of the present invention.

FIG. 1 is a diagram schematically showing a flight path of airplane 200 and airports 101 to 103 on which airplane 200 is parked in a first exemplary embodiment of the present invention, and FIG. 2 is a block diagram showing a basic configuration of a content upload system in the first exemplary embodiment of the present invention. FIG. 1 shows an example in which airplane 200 departs from airport 101 and returns to airport 101 through airport 102 and airport 103. When airplane 200 is parked on airports 101, 102, and 103, audio-video contents are uploaded during maintenance of an airframe or loading/uploading of cargoes and packages.

As shown in FIG. 2, it is assumed that three airplanes 200a to 200c (when the airplanes are not discriminated from each other, the airplanes are generally called airplanes 200) are parked on airport 101 of airports 101 to 103 at present. Airport building facilities 301 to 303 are installed in each of the airports, and airport building facility 301 is equipped with content accumulating server 311 in which audio-video contents for uploading are accumulated and antenna 321 that wirelessly transmits the audio-video contents. In this case, transmission and accumulation of contents from content accumulating servers 311 to 313 to content distributing servers 201a to 201c (when the content distributing servers are not discriminated from each other, the content distributing servers are generally called content distributing server 201) are expressed as "upload".

Content distributing server 201a mounted in airplane 200a is connected to content accumulating server 311 through a wireless network such as a high-speed wireless LAN (Local Area Network), and the contents received by antenna 205a are accumulated in content distributing server 201a as needed. The same applies to other airplanes 200b and 200c. Content accumulating server 311 continuously circularly transmits contents that are accumulated in the content accumulating server 311 and are to be uploaded from the start to the end, and content distributing servers 201a to 201c mounted on three airplanes 200a to 200c are configured to select and take necessary contents from the contents that are being transmitted. For this reason, since complex processes such as negotiation are not required between content accumulating server 311 and content distributing servers 201a to 201c, an inexpensive content upload system can be simply configured.

Since the contents are wirelessly transmitted, contents of airplanes 200a to 200c can be uploaded anywhere while being parked. Furthermore, when content accumulating server 311 uploads the contents on content distributing servers 201a to 201c by broadcasting, the contents can be simultaneously uploaded on three airplanes 200a to 200c. In this manner, a parking time is effectively utilized to make it possible to upload the contents. Furthermore, as a content transmitting scheme, in addition to a wireless LAN, a LAN cable, a coaxial cable, an optical fiber, or the like may be used.

When airplane 200 is taken off from airport 101 and landed and parked on airport 102, similarly, content distributing server 201 is connected to content accumulating server 312 through antenna 322 of airport building facility 302 via a wireless network. As in airport 103, content distributing server 201 is connected to content accumulating server 313 through antenna 323 of airport building facility 303 via a wireless network.

While an airplane is parked on airport 101, audio-video contents are uploaded from content accumulating server 311 to content distributing server 201. However, when contents that can be uploaded during parking are a part of all the contents, the system is connected to content accumulating server 312 again on airport 102 on which the airplane is parked next, and operates to receive and write transmitted contents that are not held by the system. When all the contents are not written even in airport 102, the same operation as described above is performed in airport 103 on which the airplane is parked next. More specifically, content distributing server 201 is connected to content accumulating server 313 and receives and writes unheld contents. Until all the contents are completely written, the upload operation is repeated.

The same audio-video contents are accumulated in content accumulating servers 311 to 313 arranged in airport building facilities 301 to 303 in the airports. Therefore, content distributing server 201 can operate as if content distributing server 201 is continuously connected to the same content accumulating server even though the airplane is parked on any airport. The embodiment shows an example in which airplane 200 is circularly flown through the three airports. However, the number of airports through which the airplane passes is not limited to three. The embodiment also shows an example in which three airplanes are parked on one airport. However, the number of parked airplanes is not limited to three.

Figure 3:
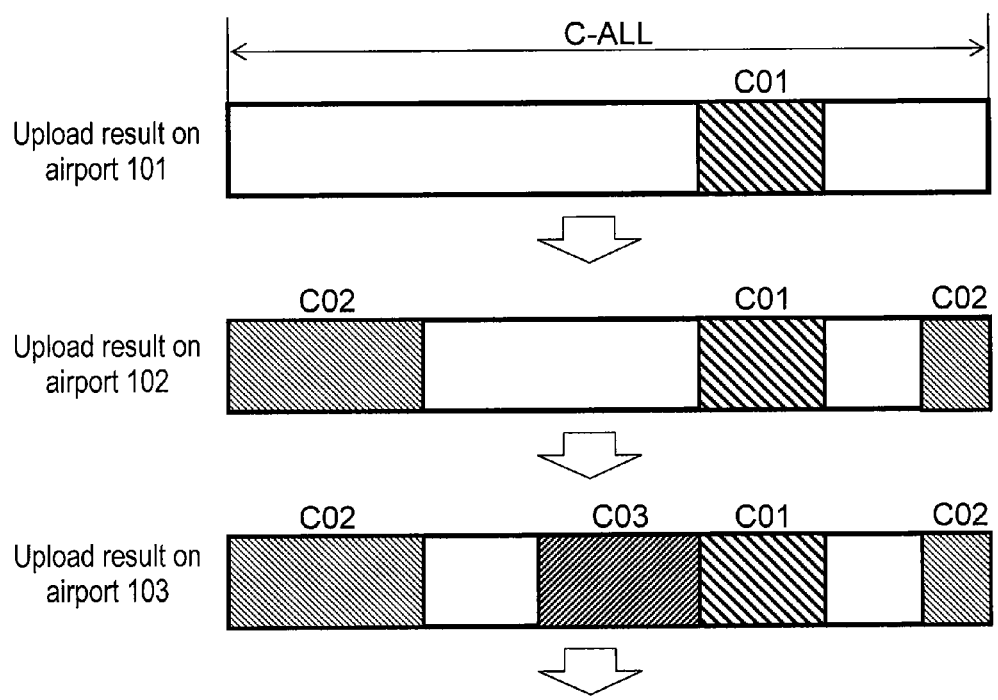
FIG. 3 is a pattern diagram showing a manner of writing contents in a content distributing server in the first exemplary embodiment of the present invention.

FIG. 3 schematically shows a manner of recording audio-video contents on content distributing server 201 of airplane 200 as a result of the operation described above. For all contents C-ALL to be uploaded, partial content C01 is uploaded on airport 101 first. Except for partial content C01, partial content C02 of the audio-video contents uploaded during parking on airport 102 is taken in. Furthermore, content C03 except for partial contents C01 and C02 is taken in on airport 103. While the operations are repeated, it is expected that all contents C-ALL be taken in on somethingth airport in the future. Since transmission of audio-video contents from the content accumulating server on each airport is circulated at arbitrary timings, unheld contents are not always taken in on all the airports, and the maximum number of times of parking until all contents C-ALL are taken in.

Partial contents C01 to C03 need not be, for example, one or a plurality of movie or music program units, and may be a part (for example, an arbitrary period from 16 minutes and 20 seconds to 53 minutes and 47 seconds) of a certain tune or a movie without a problem. In general, time stamps are recorded on frame units or the like for minimal times in an encoded audio or video file. By using the information, a specific period in a tune or a movie that has been held and a specific time period of audio-video contents transmitted from content accumulating server 311 can be easily identified.

Figure 4:
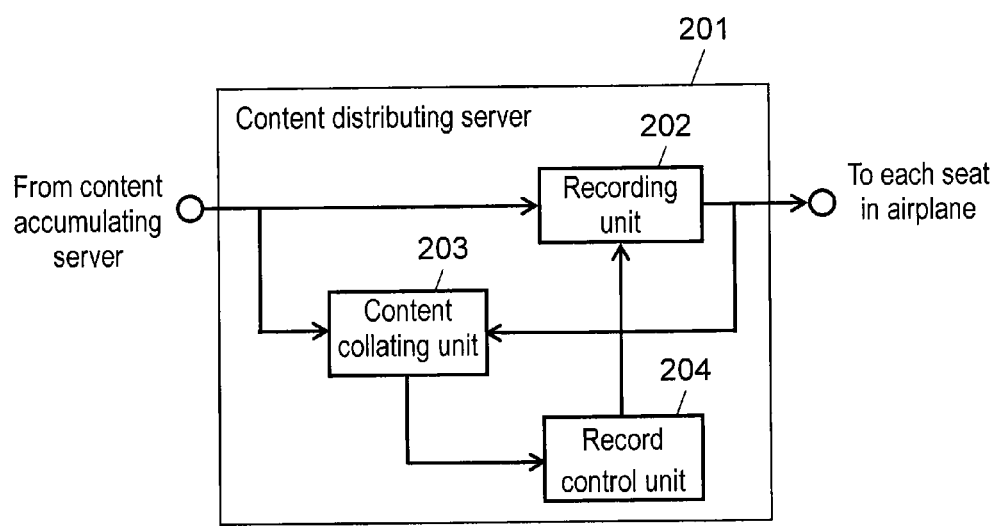
FIG. 4 is a block diagram showing an internal configuration of the content distributing server in the first exemplary embodiment of the present invention.

FIG. 4 is a block diagram showing an internal configuration of content distributing server 201 in the first exemplary embodiment of the present invention installed in airplane 200. However, functional blocks described in the drawing are described with respect to only functions related to uploading from content accumulating server 311 or the like, and functions related to audio-video content distributing function in an airplane, for example, a reproducing program request from each passenger are not described.

Audio-video contents uploaded from content accumulating server 311 are accumulated in recording unit 202 configured by a hard disk or the like. At this time, content collating unit 203 performs collation to determine whether audio-video contents that are being uploaded have been held in recording unit 202. When the audio-video contents are not held, content collating unit 203 instructs recording control unit 204 to additionally record the contents on recording unit 202. When all the necessary contents are recorded on recording unit 202, by using the new contents, the in-flight entertainment system can distribute the contents to the seats in the airplane.

Since the current in-flight entertainment service needs to be continued even in the middle of sequential recording of the new contents on recording unit 202, the interior of recording unit 202 is divided into two areas to secure a recording area for the current service and a recording area for an updated service. When all the contents are present in the area for updating, the operation can be switched to a service using the contents in the area for updating.

Distribution of the audio-video contents in the airplane may be performed by a passenger-on-demand scheme, a broadcasting multicast scheme, or a hybrid scheme obtained by combining both the schemes. These functions are functions being independent of the upload scheme according to the present invention, and are determined as design items of content distributing server 201.

In this manner, in the content upload system according to the embodiment, content accumulating servers 311 to 313 need only, continuously, circularly, and unidirectionally transmit the accumulated audio-video contents by broadcast. For this reason, content accumulating servers 311 to 313 can be realized by servers having simple structures that only repeat unidirectional content transmission. In broadcast, although a mechanism for resending contents in response to a transmission error is not used, when an error correction code is added to transmitted data to make it possible to correct an error even in occurrence of a transmission error and to secure stable transmission quality. Since content distributing server 201 does not require communication for control related to transmitted contents between content accumulating servers 311 to 313, a simple and inexpensive content upload system can be structured. Furthermore, airplane 200 need not be parked for only content uploading, efficient traffic can be expected.

Second Exemplary Embodiment

A second exemplary embodiment of the present invention will be described below. In the first exemplary embodiment, contents accumulated in content accumulating server 311 include audio-video contents of a first group the instancy of which is required and audio-video contents of a second group the instancy of which is not required. A "2-area operation" of recording unit 202 is described on the assumption that audio-video contents for an in-flight entertainment service are entirely switched for a current service and an update service at a certain timing. However, in an actual operation, a response to contents the instancy of which is required is necessary. For example, updating contents of today's news, weather forecasts, the latest event information in a destination city, the latest notification from the air carrier, and the like are desired to be handled in distinction from ordinary entertainment contents such that information and programs that are desired to be previously updated are determined as contents the instancy of which is required without waiting until all the contents are taken in.

Figure 5:
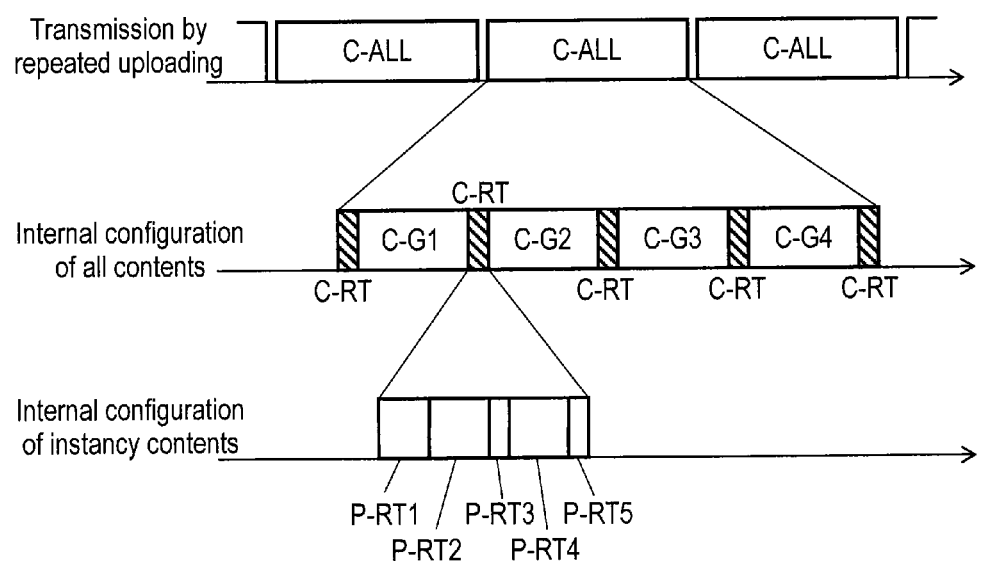
FIG. 5 is a timing chart of a transmitted signal when all contents C-CALL are periodically repeatedly uploaded in a content accumulating server in a second exemplary embodiment of the present invention.
Figure 6:
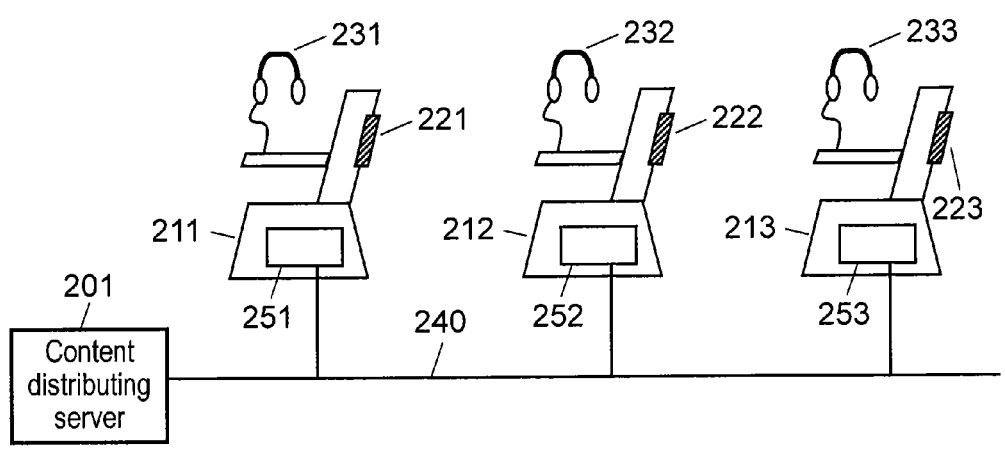
FIG. 6 is a block diagram showing a basic configuration of a conventional in-flight entertainment system.

Thus, when airplane 200 is parked, preferential uploading of the contents the instancy of which is required may be requested from content accumulating servers 311 to 313. However, when the request is required to be made, the content accumulating server serving as a characteristic feature of the present invention loses an advantage that need only continuously, circularly, and unidirectionally transmit the accumulated audio-video contents. Therefore, according to the second exemplary embodiment of the present invention, contents the instancy of which is required are quickly and reliably uploaded. A content upload system according to the embodiment will be described below with reference to FIG. 5. FIG. 5 is a timing chart of an uploading manner of content accumulating server 311 or the like in the second exemplary embodiment of the present invention to make it possible to upload contents the instancy of which is required and that has a high priority.

An upper timing chart in FIG. 5 shows a manner of periodically and repeatedly uploading all contents C-ALL. A middle timing chart in FIG. 5 shows that contents C-RT the instancy of which is required are distributed and transmitted on a specific time axis from ordinary contents C-G1 to C-G4 in all contents C-All. As shown in the figure, contents C-RT the instancy of which is required are designed such that the same contents are arranged at a plurality of positions on a time axis and frequently transmitted when contents C-ALL are transmitted once. In this manner, even though airplane 200 is parked for a short period of time, content distributing server 201 can receive and write contents C-RT at a high probability.

On the other hand, ordinary audio-video contents are transmitted only once in transmission of all contents C-ALL, and contents C-RT the instancy of which is required are transmitted in an interruption manner. For this reason, the audio-video contents are transmitted to be divided into C-G1 to C-G4 in the middle timing chart in FIG. 5.

A lower timing chart in FIG. 5 shows an internal configuration of contents C-RT the instancy of which is required. Programs P-RT1 to P-RT5 of five types are included.

In content upload system in the embodiment as described above, contents C-RT the instancy of which is required are configured such that the same contents are transmitted two or more times when contents C-ALL are transmitted once. In this manner, content distributing server 201 can quickly and reliably receive and accumulate contents C-RT.

As described above, according to the embodiment, a content upload system for an in-flight entertainment system that makes it possible to dispersively write large-volume audio-video contents on the occasion of parking on a plurality of airports can be provided.

According to the embodiment of the present invention, a destination on which audio-video contents are uploaded is one or a plurality of concentrated content distributing server 201 arranged in airplane 200. However, the destination can be a dispersive content distributing server arranged for each seat or each of seat units including 2 to 5 seats, as a matter of course.

In the embodiment, contents to be uploaded are explained as AV information of a movie or music. However, the contents are not limited to the AV information, and information such as flight information or airport information of the airplane may be uploaded.

INDUSTRIAL APPLICABILITY

The present invention can be used as a content upload system that uploads contents from a content accumulating server in an airport to a content distributing server in an airplane when audio-video contents for an in-flight entertainment system popularly used in airplanes on an international flight or the like are updated.

REFERENCE MARKS IN THE DRAWINGS

101 to 103 Airport
200, 200*a*, 200*b*, 200*c* Airplane
201, 201*a*, 201*b*, 201*c* Content distributing server
202 Recording unit
203 Content collating unit
204 Record control unit
205*a*, 205*b*, 205*c*, 321, 322, 323 Antenna
211 to 213 Seat
221 to 223 Display terminal
231 to 233 Headphone
251 to 253 Content processing terminal
301 to 303 Airport building facility
311 to 313 Content accumulating server

The invention claimed is:

1. A content upload system comprising:
a content distributing server installed in an airplane; and
a plurality of content accumulating servers installed in a plurality of airports, the content accumulating servers storing a plurality of audio-video contents,
wherein
each of the content accumulating servers installed in each of the airports transmits each of the audio-video contents to the content distributing server through a network continuously and cyclically;
each of the audio-video contents is the same; and
the content distributing server includes:
a recording unit that stores each of the audio-video contents transmitted from each of the content accumulating servers installed in each of the airports;
a content collating unit that determines whether each of the audio-video contents transmitted to the content distribution server has been stored in the recording unit; and
a recording control unit that, while the airplane is parked at each of the airports, records to the recording unit a portion of each of the audio-video contents determined not to have been stored by the content collating unit.

2. The content upload system according to claim 1 wherein each of the content accumulating servers continuously transmits each of the audio-video contents to the content distributing server without negotiation between the content distributing server and each of the content accumulating servers.

3. The content upload system according to claim 1, wherein each of the audio-video contents stored in each of the content accumulating servers includes a first group formed of contents requiring immediate transmission and a second group formed of contents requiring no immediate transmission, and the contents of the first group are transmitted more frequently than those of the second group.

4. The content upload system according to claim 2, wherein each of the audio-video contents stored in each of the content accumulating servers includes a first group formed of contents requiring immediate transmission and a second group formed of contents requiring no immediate transmission, and the contents of the first group are transmitted more frequently than those of the second group.

5. A content distributing server installed in an airplane that receives a plurality of audio-video contents from a plurality of content accumulating servers installed in a plurality of airports, each of the content accumulating servers being installed in each of the airports and transmitting each of the audio-video contents to the content distributing server through a network continuously and cyclically, each of the audio-video contents being the same, and the content distributing server comprising:
a recording unit that stores each of the audio-video contents transmitted from each of the content accumulating servers installed in each of the airports;
a content collating unit that determines whether each of the audio-video contents transmitted to the content distributing server has been stored in the recording unit; and
a recording control unit that, while the airplane is parked at each of the airports, records to the recording unit a portion of each of the audio-video contents determined not to have been stored by the content collating unit.

6. The content distributing server according to claim 5 wherein
each of the content accumulating servers transmits each of the audio-video contents to the content distributing server without negotiation between the content distributing server and each of the content accumulating servers.

7. The content distributing server according to claim 5, wherein
each of the audio-video contents stored in each of the content accumulating servers includes a first group formed of audio video contents requiring immediate transmission and a second group formed of contents requiring no immediate transmission, and the contents of the first group are transmitted more frequently than those of the second group.

8. The content distributing server according to claim 6, wherein
each of the audio-video contents stored in each of the content accumulating servers includes a first group formed of contents requiring immediate transmission and a second group formed of contents requiring no immediate transmission, and the contents of the first group are transmitted more frequently than those of the second group.

* * * * *